United States Patent [19]
Ohtsubo et al.

[11] 4,340,284
[45] Jul. 20, 1982

[54] TEMPERATURE-COMPENSATED SIGNAL TRANSMITTING DEVICE

[75] Inventors: Yoshiaki Ohtsubo, Kawasaki; Sakuji Watanabe, Warabi, both of Japan

[73] Assignee: Nippon Kogaku K.K., Tokyo, Japan

[21] Appl. No.: 268,561

[22] Filed: May 29, 1981

Related U.S. Application Data

[63] Continuation of Ser. No. 138,980, Apr. 10, 1980, abandoned.

[30] Foreign Application Priority Data

May 1, 1979 [JP] Japan .................................. 54/52473

[51] Int. Cl.³ ....................... G03B 7/083; G03B 15/03
[52] U.S. Cl. ................................... 354/50; 354/60 R; 354/60 F; 354/149
[58] Field of Search ................. 354/60 R, 60 F, 139, 354/149, 50, 51

[56] References Cited

U.S. PATENT DOCUMENTS 4,099,115  7/1978  Watanabe ..................... 354/60 R X Primary Examiner—Michael L. Gellner
Attorney, Agent, or Firm—Fitzpatrick, Cella, Harper & Scinto

[57] ABSTRACT

In a camera having means for arbitrarily selecting the exposure condition of a film thereby to generate a signal based on said selection, said signal representing exposure information and having a temperature coefficient, and exposure time determining means for determining the opening time of the shutter of the camera on the basis of said signal, said exposure information being produced for a speed light during the photography using said speed light, there is provided signal transfer means for receiving the signal of said exposure information as input and transmitting said exposure information to said speed light. Said signal transmitting means has a transmission function including a temperature coefficient opposite in polarity to said first mentioned temperature coefficient.

9 Claims, 3 Drawing Figures

TEMPERATURE-COMPENSATED SIGNAL TRANSMITTING DEVICE

This is a continuation of application Ser. No. 138,980, filed Apr. 10, 1980, now abandoned.

BACKGROUND OF THE INVENTION

1. Field of the Invention

This invention relates to a temperature-compensated device for transmitting to a speed light a signal representing the exposure condition of a camera.

2. Description of the Prior Art

In recent years, the growth of electronic elements in flash photography devices comprising a combination of a camera and a speed light has advanced rapidly and various devices have been proposed in which an aperture value representing the exposure condition of the camera, a preset ASA value, etc. are also transmitted to the speed light to control the quantity of emitted light of a flash discharge tube in accordance with those values or to use those values to indicate a warning. Also, such speed light usually has a measuring operational circuit for effecting automatic light adjustment which is accurate to a certain degree. Now, the measuring operational circuit of this type, as is known in the camera art, includes a temperature coefficient in the transfer function (ratio of input signal to output signal) of the circuit and therefore, an input signal having a temperature coefficient reverse to said temperature coefficient is applied to such measuring operational circuit. By this, there is obtained an output signal having substantially no temperature coefficient. Thus, the input signal having a temperature coefficient corresponds to the previously mentioned aperture value or ASA value. Accordingly, in photography using only a camera, there is always obtained proper information by offsetting of such temperature coefficient. However, if an attempt is made to transmit to the speed light the information representing these exposure conditions as described above, a great problem occurs.

The problem is that the information having a temperature coefficient and representing the exposure conditions becomes information dependent on the temperature on the camera side and this becomes erroneous information in respect of the speed light which is at a different temperature. Thus, as hitherto described, in a single body such as the camera or the speed light, it is assumed that the ratio of the information applied to the aforementioned measuring operational circuit or other circuit to the finally produced information, namely, the overall transfer function as those single bodies, has no temperature-dependency.

So, for example, assume that, in a cold environment, a photographer who has so far carried out photography by using only a camera without using a speed light tries to effect flash photography by mounting to the camera the speed light which has so far been placed and warmed in his pocket or the like. The temperature difference between the camera and the speed light is great and therefore, the information transmitted from the camera to the speed light (in most cases, an electrical signal) has a temperature component different from that of other information produced by each circuit in the speed light. This has caused malfunctioning of the speed light (for example, a failure in the automatic light adjusting operation or in the warning indication that the setting was outside of the light adjustment range) which is essentially unavoidable.

SUMMARY OF THE INVENTION

We have conceived and contribute by the present invention a device for compensating for the electrical signal of a camera having a temperature characteristic.

As one aspect of the present invention we provide a signal transmitting device which can transmit the compensated signal to a speed light and match the same with the temperature-dependency of the speed light.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein.

DESCRIPTION OF THE PREFERRED EMBODIMENT

Figure 1:
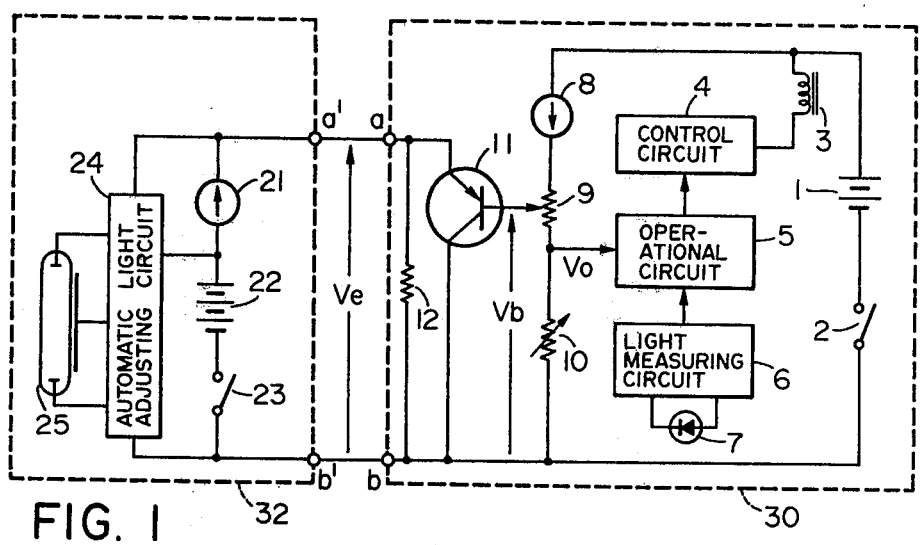
FIG. 1 is a circuit diagram showing an embodiment of the present invention.

In FIG. 1, the terminals a and b of a camera 30 are connected to the terminals a' and b', respectively, of a speed light 32. A measuring circuit 6, an operational circuit 5 and a control circuit 4 included in the camera 30 are all supplied with power from a battery 1 upon closing of a main switch 2. Variable resistors 9 and 10 are supplied with a current from a current source 8 which generates a current directly proportional to absolute temperature. The variable resistor 10 receives, as input, the exposure condition such as ASA value, aperture value, etc., and a voltage $V_0$ produced across this resistor 10 is applied to the operational circuit 5. PNP transistor (hereinafter referred to as Tr.) 11 whose base is connected to the slider of the variable resistor 9 acts as a common collector configuration, namely, a so-called emitter follower. The variation in a voltage $V_b$ produced at this Tr.11 substantially intactly occurs between the terminals a and b as the variation in an emitter voltage $V_e$. The emitter of this Tr.11 is driven by a current source 21 which produces a current directly proportional to the absolute temperature, upon closing of the main switch 23 of the speed light 32. The emitter voltage $V_e$ is applied to a conventional automatic light adjusting circuit 24, etc. This automatic light adjusting circuit 24 generates a high voltage upon power supply of a battery 22 and applies it to the electrode of a flash discharge tube 25. By a trigger signal (not shown) produced in response to the operation of the shutter button (not shown) of the camera 30, the discharge tube 25 starts to emit light, and stops emitting light in accordance with the light adjusting operation. As the information for this light adjusting operation, the emitter voltage $V_e$ (hereinafter referred to as the voltage $V_e$) produced from the camera 30 is applied to the light adjusting circuit 24. It is well-known that the light adjusting circuit 24 includes a light-receiving element for measuring the brightness of an object. A resistor 12 is provided as a protective resistor for preventing the electrostatic break-down of Tr.11.

The operation of this circuit will now be described briefly. The measuring circuit 6 receives as an input the signal of a light-receiving element 7 provided in the camera 30, thereby producing a signal corresponding to the brightness of the object which signal is transmitted to the operational circuit 5. This signal corresponding to the brightness, namely, the brightness information, generally has a temperature coefficient. This is because an amplifier or the like for effecting logarithmic conversion is used in the measuring circuit 6. Therefore, the current source 8 having a temperature coefficient becomes necessary so that the voltage $V_o$ applied to the operational circuit 5, namely, the exposure information, may also have a temperature coefficient and the temperature characteristic may be offset in the operation result. The operation result is transmitted to the control circuit 4 to operate a coil 3 for controlling the exposure time of the film and to release the restraint of the rearward shutter curtain, thus imparting a predetermined exposure time to the film. On the other hand, the speed light 32 receives the voltage $V_e$ of this exposure information as input and varies the quantity of light emitted from the discharge tube 25 by the then ASA value, aperture value, etc. as well. In addition to this, by this voltage $V_e$, it is possible to deliver a warning indication to the photographer that the condition is beyond the range of light adjustment. That is, the light adjusting circuit 24 includes a measuring circuit and operational circuit similar to those included in the camera 30.

Now, Tr.11, as hitherto described, acts to transmit the exposure information to the speed light 32. So, the operation of this Tr.11 will be described in detail by reference to FIG. 2.

Figure 2:
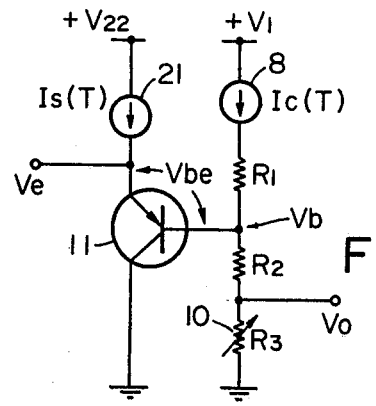
FIG. 2 is a circuit diagram illustrating the operation of a transistor 11 in the embodiment.

Voltage $V_1$ represents the voltage of the battery 1, and voltage $V_{22}$ represents the voltage of the battery 22. In the circuit of FIG. 2, it is only a current source 21 that is provided in the speed light 32 and the current value thereof has a temperature coefficient and therefore, it is defined as $I_s(T)$. The current source 8 provided in the camera 30 also has a temperature coefficient and therefore, the current value thereof is defined as $I_c(T)$. The resistor 9 is for adjustment and its resistance values are defined as $R_1$ and $R_2$ on the assumption that the position of the slider thereof is fixed. Further, the resistor 10 for setting the exposure information has its resistance value in its arbitrary set position defined as $R_3$.

Now, the exposure information is obtained from the voltage $V_o$.

$$V_O = R_3 I_c(T) \tag{1}$$

Usually, the base-emitter voltage $V_{be}$ of the transistor also has a temperature coefficient. If it is expressed as $V_{be}(T)$, the emitter voltage $V_e$ of Tr.11 is expressed as follows:

$$V_e = V_b + V_{be}(T) = (R_2 + R_3)I_c(T) + V_{be}(T) \tag{2}$$

As is well-known, $V_{be}(T)$ more or less differs depending on the emitter current, but has a temperature coefficient of about $-2.2$ mV/deg. (which depends on the reverse saturation current). So, consideration will be given as temperature $t_2 >$ temperature $t_1$. Let $\Delta V_e$ be the variation in emitter voltage $V_e$ at temperatures $t_2$ and $t_1$.

$$\Delta V_e = (R_2 + R_3)I_c(t_1)\left(\frac{t_2 - t_1}{t_1}\right) - 2.2 \times 10^{-3}(t_2 - t_1) \tag{3}$$

Further, from this equation, the condition for $\Delta V_e = 0$ is sought after.

$$(R_2 + R_3)I_c(t_1) = 2.2 \times 10^{-3} x t_1 \tag{4}$$

For example, when it is premised that the camera is used in a relatively warm environment, and if the temperature during the adjustment of the resistance value of the resistor 9 is a normal temperature, then $t_1 = 298°$ K.

$$(R_2 + R_3)I_c(t_1) = 0.656[V] \tag{5}$$

By thus pre-assuming the temperature at which the camera is used and adjusting the resistor 9 so that its resistance assumes the resistance value $R_2$ which satisfies equation (4), the temperature coefficient of the voltage $V_e$ becomes substantially zero.

Figure 3:
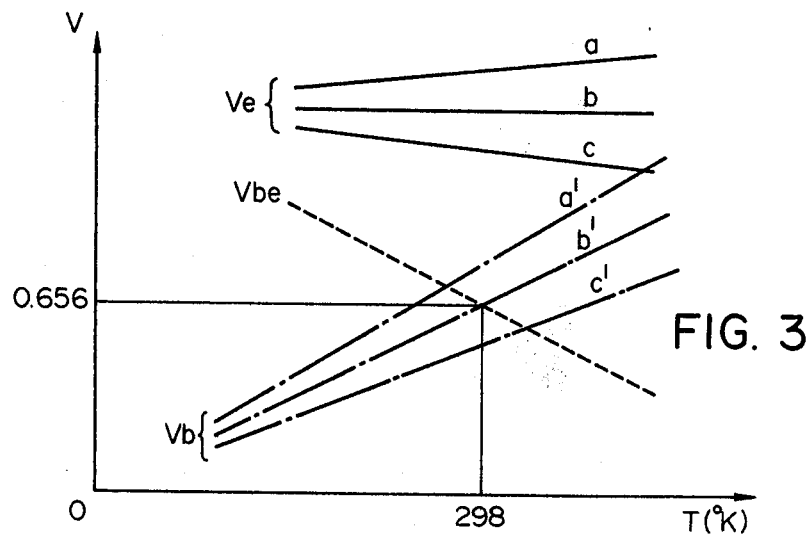
FIG. 3 is a graph simply showing the temperature characteristic of each voltage in the embodiment.

However, as is apparent from equation (5), only when the resistance value $R_3$ of the resistor 10 assumes a specific value can the temperature coefficient be zero. Thus, the variation in temperature coefficient resulting from the variation in this resistance value $R_3$ will be described by reference to FIG. 3. In FIG. 3, voltage $V_b$ represents the left side of equation (4). Since $V_b = 0.656[V]$ at absolute temperature 298° K., $V_b$ assumes the gradient of straight line $b'$ and, by being offset by the temperature coefficient of the voltage $V_{be}$, the voltage $V_e$ eliminates its gradient as indicated by straight line b from $V_e = V_b + V_{be}$. It is therefore assumed that the voltage $V_o$ is varied by $\Delta V_o$ for the variation, per exposure information 1 EV, in the resistance value $R_3$ of the resistor 10 which introduces the exposure information. It is also assumed that the resistance value $R_3$ is varied so that the EV value is varied by $\pm n$ steps from the resistance value $R_3$ during the adjustment. Accordingly, $(R_2 + R_3)I_c(t_1) = V_b$ and from equation (3), the temperature coefficient of the voltage $V_e$ is expressed as follows:

$$\frac{\Delta V_e}{t_2 - t_1} = \frac{V_b \pm n \cdot \Delta V_o}{t_1} - 2.2 \times 10^{-3} \tag{6}$$

Thus, by the variation in resistance value $R_3$ corresponding to the EV value, the temperature coefficient of the voltage $V_e$ is varied by $$\frac{\pm n \cdot \Delta V_o}{t_1}.$$

In FIG. 3, the gradients of straight lines $a'$ and $c'$ of the voltage $V_b$ are the $\pm n$ step voltage variation corresponding to the EV value. For such variation in the temperature coefficient of the voltage $V_b$, the temperature coefficient of the voltage $V_e$ is considerably small as represented by the gradients of straight lines a and c. For example, it is assumed that, as the exposure information, ±4 EV has been introduced at the resistance value $R_3$ of the resistor 10. Since $\Delta V_o$ is the variation per 1 EV, the variation in the temperature coefficient of the voltage $V_e$, if converted into EV value, becomes ±n/$t_1$[EV/deg.]. Accordingly, at temperature $t_1 = 298°$ K., it becomes ±0.013[EV/deg.]. This temperature-compensated voltage $V_e$ is transmitted to the speed light and, even if the automatic light adjusting operation is effected on the basis of this voltage, the value of this variation can be neglected in the actual photography.

It is seen that, by compensating for the temperature characteristic in the circuit construction on the speed light side, as previously described, the temperature dependency from the camera side becomes dominant, as a result of which the temperature-dependency on the speed light side is eliminated. That is, the influence of the current value $I_s(T)$ shown in FIG. 2 which is dependent on the temperature of the speed light 32 can be neglected.

We believe that the construction and operation of our novel temperature-compensated signal transmitting device will now be understood and that the advantages thereof will be fully appreciated by those persons skilled in the art.

We claim:

1. A camera having means for arbitrarily selecting the exposure condition of a film thereby to generate a signal based on said selection, said signal representing exposure information and having a temperature coefficient, and exposure time determining means for determining the opening time of the shutter of the camera on the basis of said signal, said exposure information being produced for a speed light during photography using said speed light, the improvement comprising:

signal transmitting means for receiving the signal of said exposure information as input and transmitting said exposure information to said speed light, said signal transmitting means having a transfer function including a temperature coefficient opposite in polarity to said temperature coefficient of said signal representing exposure information.

2. The camera according to claim 1, wherein said generating means has a current source whose current value is variable in direct proportion to absolute temperature, and a resistor whose resistance value is variable in accordance with the EV value of said camera and which is supplied with power from said current source, the voltage produced in said variable resistor representing the signal of said exposure information.

3. The camera according to claim 2, wherein said exposure time determining means includes a circuit for operating the measured value of said measuring circuit and the signal of said exposure information, and a control circuit for closing said shutter on the basis of the operation result of said operational circuit.

4. The camera according to claim 3, wherein said signal transmitting means includes an amplifier circuit provided by the common collector configuration of a transistor, and applies the signal of said exposure information to the base of said transistor to produce for said speed light device a voltage which is the sum of the base-emitter voltage $V_{be}$ appearing at the emitter of said transistor and having a negative temperature coefficient, and said signal.

5. The camera according to claim 4, wherein said amplifier circuit includes an adjusting resistor for substantially offsetting the temperature coefficient of said current source and the temperature coefficient of said $V_{be}$, said adjusting resistor being connected between one end of said variable resistor and the base of said transistor and supplied with power from said current source.

6. The camera according to claim 5, wherein said speed light device includes a current source for supplying a current to the emitter of said transistor, the current value of said current source being variable in direct proportion to absolute temperature, and wherein a voltage produced at the junction between said current source and said emitter represents the exposure information of said camera.

7. The camera according to claim 6, wherein said variable resistor has a slider operatively associated with means for setting the ASA value and aperture of said camera.

8. A camera having means for arbitrarily selecting the exposure condition of a film thereby to generate a signal based on said selection, said signal representing exposure information and having a temperature coefficient, and exposure control means for determining a proper exposure value for the film corresponding to said signal, said exposure information being produced for a speed light during photography using said speed light, the improvement comprising:

signal transmitting means for receiving the signal of said exposure information as input and transmitting said exposure information to said speed light, said signal transmitting means having a transfer function including a temperature coefficient opposite in polarity to said temperature coefficient of said signal representing exposure information.

9. The camera according to claim 8, wherein said exposure control means includes a circuit for measuring the brightness of an object, a circuit for operating said proper exposure value on the basis of the measured value of said measuring circuit and the signal of said exposure information, and a control circuit for determining the opening time of a shutter of the camera on the basis of said proper exposure value.

* * * * *